(12) United States Patent
Adams

(10) Patent No.: US 6,602,075 B2
(45) Date of Patent: Aug. 5, 2003

(54) METHOD OF TEACHING THROUGH EXPOSURE TO RELEVANT PERSPECTIVE

(75) Inventor: Tony Adams, Overland Park, KS (US)

(73) Assignee: Discovertheoutdoors.com, Inc., Overland Park, KS (US)

( * ) Notice: Subject to any disclaimer, the term of this patent is extended or adjusted under 35 U.S.C. 154(b) by 0 days.

(21) Appl. No.: 09/990,649

(22) Filed: Nov. 20, 2001

(65) Prior Publication Data

US 2003/0096217 A1 May 22, 2003

(51) Int. Cl.$^7$ .............................................. G09B 19/00
(52) U.S. Cl. ...................................... 434/236; 434/219
(58) Field of Search .............................. 434/29–72, 79, 434/80, 91, 130–153, 219–226, 234, 235, 236, 237, 238, 247–303, 305, 308–318, 365–433

(56) References Cited

U.S. PATENT DOCUMENTS

| | | | | | |
|---|---|---|---|---|---|
| 4,856,997 | A | * | 8/1989 | Mellecker ..................... | 434/72 |
| 5,240,417 | A | * | 8/1993 | Smithson et al. ............. | 434/61 |
| 5,800,179 | A | * | 9/1998 | Bailey ......................... | 434/262 |
| 5,857,066 | A | * | 1/1999 | Wyche et al. ............... | 345/420 |
| 5,882,204 | A | * | 3/1999 | Iannazo et al. ............. | 434/251 |
| 5,945,927 | A | * | 8/1999 | Nakayama et al. ......... | 340/995 |
| 5,984,684 | A | * | 11/1999 | Brostedt et al. ............ | 434/252 |
| 6,224,387 | B1 | * | 5/2001 | Jones ......................... | 434/252 |
| 6,270,403 | B1 | * | 8/2001 | Watanabe et al. ............. | 463/7 |
| 6,336,891 | B1 | * | 1/2002 | Fedrigon et al. ............... | 482/8 |

FOREIGN PATENT DOCUMENTS

JP          08280834 A     * 10/1996

OTHER PUBLICATIONS

Joe Michniewicz, "High tech enhances fishing, hunting", Feb. 1996, Outdoors, Telegram & Gazette.*
Steve Alexander, "Deer Hunter, a realistic computer game, on target with players // Game developed in Plymouth at GT Interactive Software", May 1998, startribune.com.*
Simon Challands, "Descent II", 2000, Acorn Arcade—Reviews: Commercial, One Point Nought.*

* cited by examiner

*Primary Examiner*—John Edmund Rovnak
(74) *Attorney, Agent, or Firm*—Hovey Williams LLP

(57) ABSTRACT

A method of teaching a skill, such as, for example, hunting, tracking, or game-playing technique, whereby the student is exposed to the perspective of a relevant person, animal, or object, such as, for example, a game player, animal, or ball, whose identity is determined by the nature of the skill, and wherein a mechanism, such as, for example, video, computer animation, virtual reality, or role-playing, is used to impart the perspective. The method broadly comprises the steps of identifying a behavior of the thing, wherein the behavior is related to the skill; modeling a perspective of the thing related to the behavior in terms understandable by the student; implementing the model using a suitable mechanism; and introducing the student to the mechanism such that, through the mechanism, the student is able to experience the perspective of the thing and to thereby better understand the behavior and the skill.

7 Claims, 4 Drawing Sheets

METHOD OF TEACHING THROUGH EXPOSURE TO RELEVANT PERSPECTIVE

BACKGROUND OF THE INVENTION

1. Field of the Invention

The present invention relates to methods of teaching wherein the student is exposed to or experiences the perspective of a relevant person, animal, or object. More particularly, the present invention concerns a method of teaching a skill, such as, for example, hunting, tracking, or game-playing technique, whereby the student is exposed to or otherwise experiences the perspective of a relevant person, animal, or object, such as, for example, a game player, animal, or ball, whose identity is determined by the nature of the skill, and wherein a mechanism, such as, for example, prerecorded video, computer animation, virtual reality, role-playing, or a similar mechanism, is used to impart the perspective to the student.

2. Description of the Prior Art

It is often helpful when learning a skill to consider and appreciate the environment and context in which the skill is performed. A hunter learning proper duck hunting techniques, for example, must learn to properly camouflage a blind or other concealed shelter or area from which the hunter will observe and shoot; arrange duck decoys in a realistic and effective pattern on a pond or other body of water; and make realistic and appropriate duck calls at the proper times. Unfortunately, the hunter will typically be taught such techniques from a two-dimensional human perspective which may provide inadequate insight into the efficacy of the hunter's endeavors and any actual effects stemming therefrom.

Similarly, a golfer, for example, may intellectually comprehend a need to account for wind shear when driving or to account for ground contours when putting, but may lack a fundamental understanding or appreciation of potential forces which might act on the ball. Without such understanding, the golfer can never fully learn or appreciate proper driving or putting techniques.

Due to the above-identified and other problems and disadvantages in the art, a need exists for an improved method of teaching a skill such as hunting or sporting techniques.

SUMMARY OF THE INVENTION

The present invention provides a distinct advance in the art of teaching. More particularly, the present invention concerns a method of teaching a skill, such as, for example, hunting, tracking, or game-playing technique, whereby a student is exposed to or otherwise experiences a perspective of a relevant thing, whether person, animal, or object, such as, for example, a game player, animal, or ball, whose identity is determined by the nature of the skill, and wherein a mechanism, such as, for example, prerecorded video, computer animation, virtual reality, role-playing, or a similar mechanism, is used to impart the perspective to the student.

In a preferred embodiment, the method broadly comprises the general steps of identifying a behavior of the thing, wherein the behavior is related to the skill; modeling a perspective of the thing related to the behavior in terms understandable by the student; implementing the model using an appropriate mechanism; and introducing the student to the mechanism such that, through the mechanism, the student is exposed to or otherwise experiences the perspective of the thing and is thereby better able to understand the behavior. It will be appreciated that an understanding or better understanding of the behavior will result in the learning of or improvement in performance of the skill.

As mentioned, in prior art teaching methods the student is faced with learning the skill without truly understanding or developing a fundamental appreciation of why certain things are done the way they are. The present invention advantageously provides exposure to and appreciation of a perspective which is helpful to the student in performing the skill. In duck hunting, for example, it is advantageous to understand the behaviors and perspectives of a duck. Similarly, in the game of golf it is advantageous to understand the behaviors and perspectives of a skilled player.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

The present invention concerns a method of teaching a skill, such as, for example, hunting, tracking, or game-playing technique, whereby a student is exposed to or otherwise experiences a perspective of a relevant thing, whether person, animal, or object, such as, for example, a game player, animal, or ball, whose identity is determined by the nature of the skill, and wherein a mechanism, such as, for example, prerecorded video, computer animation, virtual reality, role-playing, or a similar mechanism, is used to impart the perspective.

Figure 1:
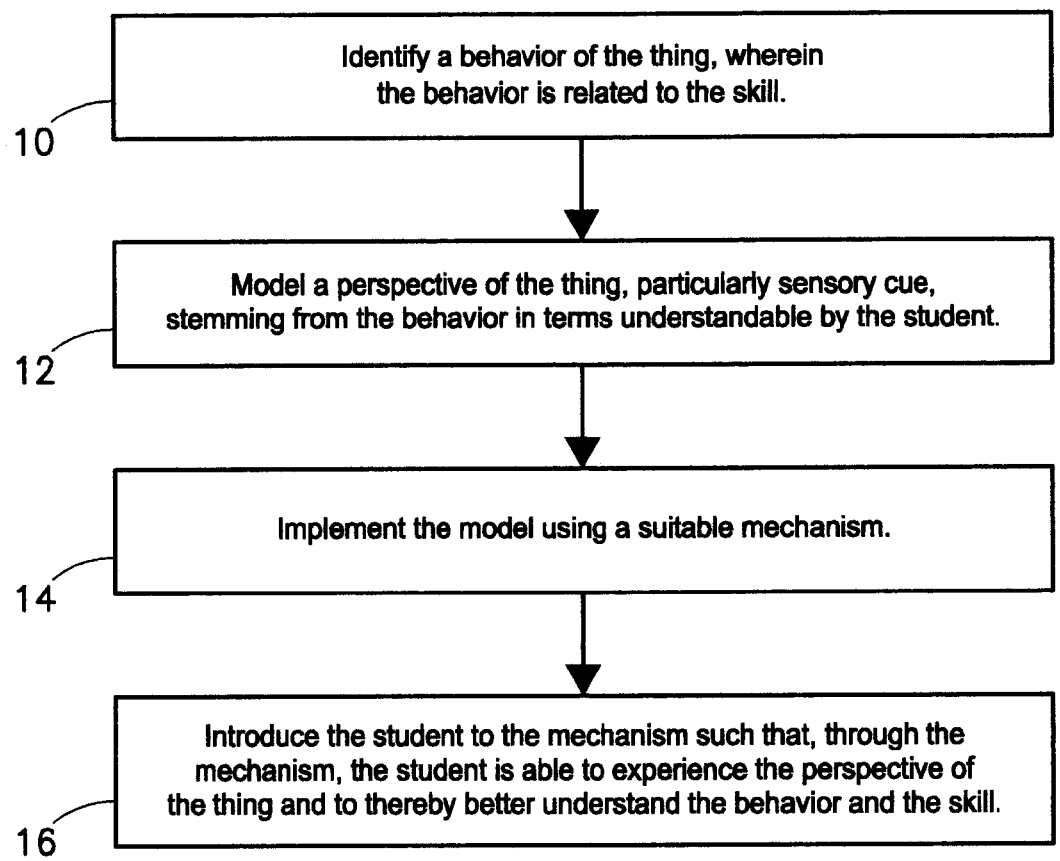
FIG. 1 is a flowchart showing a sequence of general steps in a preferred embodiment of the present invention.

Referring to FIG. 1, the method broadly comprises the general steps of identifying a behavior of the thing, wherein the behavior is related to the skill, as depicted in box 10; modeling the perspective of the thing related to the behavior in terms understandable by the student, as depicted in box 12; implementing the model using an appropriate mechanism, as depicted in box 14; and introducing the student to the mechanism such that, through the mechanism, the student is exposed to or otherwise experiences the perspective of the thing and is thereby better able to understand the behavior, as depicted in box 16. It will be appreciated that an understanding or better understanding of the behavior will result in the learning of or improvement in the performance of the skill.

The step of identifying the behavior of the thing, wherein the behavior is related to the skill, as depicted in box 10, involves identifying one or more actions or reactions or other behaviors exhibited by the thing in relation to the skill. It is this behavior that the student must experience and understand in order to improve in the skill. For example, referring also to FIG. 2, if the skill to be taught is duck hunting, including creating and camouflaging a blind 20 and lying-in-wait near a pond 22 or other potential landing area, then the thing is a duck 24 and the behavior is the duck's behavior in relation to the blind 20 and the hunter's efforts at lying-in-wait. This behavior might include, for example, the duck's propensity to circle the pond 22 prior to landing; the duck's propensity to call to one or more decoys 26 it perceives to be other live ducks; and the duck's reactions to certain duck calls made by the hunter.

The step of modeling the perspective of the thing related to the behavior in terms understandable by the student, as depicted in box 12, involves generating or obtaining a model operable to accurately describe the perspective, particularly visual, audible, tactile, and olfactory sensory cues, of the thing with regard to the behavior of interest. The model may take any form which is appropriate and suitable for communicating the perspective of the thing to the student given the mechanism for implementing the model. In some cases, the model will dictate the nature of the mechanism, as, for example, when the model relates to visual perspectives, in which case the mechanism must have a display component; in other cases, the mechanism will dictate the nature of the model, as, for example, when the only cost effective mechanism is prerecorded video, in which case the model must be adapted to a provide a presentation using only a visual and audible format.

Figure 2:
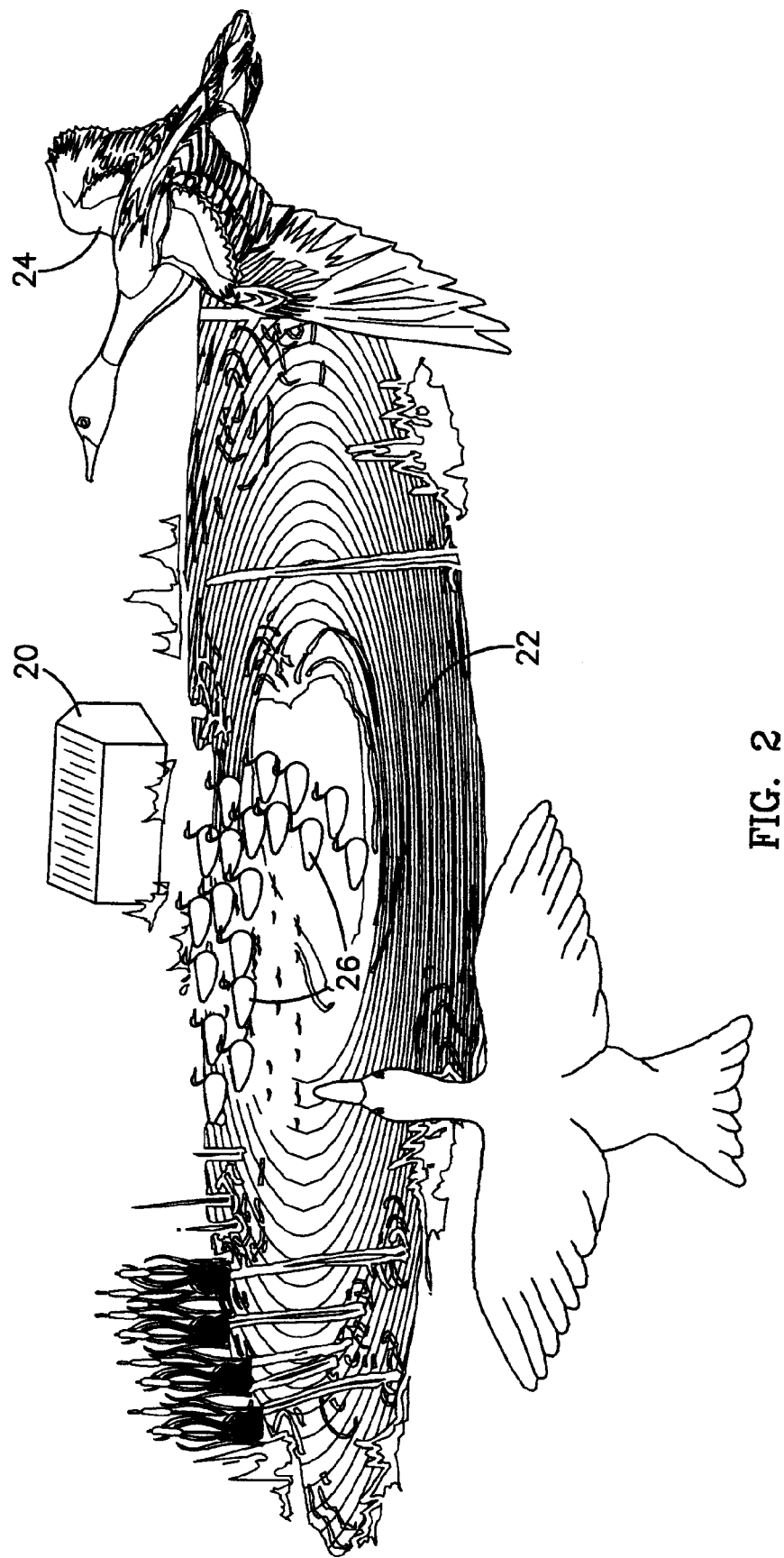
FIG. 2 is a perspective view looking down on an area of land associated with duck hunting, wherein the perspective is that of a flying duck.

Referring also to FIG. 2, continuing the duck hunting example, the duck 24, while circling the pond 22 or other potential landing area, may see a variety of views of the blind 20, including a backside, rather than just a side of the blind 20 facing the pond 22. If the student does not know of the duck's circling behavior, then he or she may not anticipate a need to camouflage all sides of the blind 20. Similarly, being familiar with only a two-dimensional human perspective, it may not occur to the hunter to camouflage a top side of the blind 20. Furthermore, when calling to the numerous decoys 26, the duck may hear only one return call coming from the blind 20 rather than from the decoys 26. If the student does not appreciate the duck's changing perspective as it circles, then he or she may not anticipate that the duck 24 may locate the return call as being from a source or location other than the decoys 26. Additionally, if the student does not know of the significance associated with decoy numbers and arrangement, then he or she may not anticipate the duck's reaction to the decoys 26. Additionally, the duck's call may have a particular meaning which is incompatible with the return call, or the return call may be inappropriate for the situation. If the student does not appreciate the variety and complexity of the duck's calls, then he or she may not understand that an incompatible or inappropriate return call may be interpreted by the duck 24 as an indication of danger. Thus, the student stands to gain great insight into duck behavior by exposure to the duck's perspective, and, through such insight and understanding, improve tremendously in hunting skill and technique.

The step of implementing the model using an appropriate mechanism, as depicted in box 14, involves selecting an appropriate mechanism, based potentially upon a variety of considerations, and implementing the model using the mechanism such that the perspective may be effectively communicate to the student. Thus, it is through the mechanism that the student experiences and gains a better understanding of the thing's perspective, thereby improving the student's skill. As mentioned, the nature of the mechanism may depend at least partly upon the nature of the model, but may also depend upon or be dictated by a variety of other considerations, including, for example, cost, space, location, and student ability. Potential mechanisms include, for example, prerecorded video, computer animation, virtual reality, and role-playing.

Continuing the duck hunting example, the duck 24 and one or more simulated hunting environments may be created using computer animation and presented as an interactive computer-based presentation. An interactive ability allows the student a measure of control over the presentation, thereby increasing its efficacy. The student may, for example, be provided with an ability to skip, speed up, or review sections of the presentation. In more complex computer-based presentations, the student may be provided with an ability to change features of the hunting environment, including, for example, tree and vegetation density, land contour, and pond shape; re-arrange or add to or subtract from the decoys 26; and return different calls in response to the duck's calls, thereby adapting the presentation to more accurately reflect an actual hunting area and allowing the student to test a variety of scenarios.

The step of introducing the student to the mechanism such that through the mechanism, the student is exposed to and can experience the perspective of the thing and thereby better understand the behavior, as depicted in box 16, involves immersing the student in the perspective of the thing so that the student gains a better understanding of the behavior of the thing through first-hand experience. This step will depend greatly on the nature of the mechanism. Prerecorded video, relatively simple computer animation, and, in some cases, role-playing mechanisms may be provided to the student for use without further instruction or interaction. Relatively complex computer animation and virtual reality mechanisms may require that the student be introduced to the mechanism at a special facility where additional instruction or interaction may be provided.

Continuing the duck hunting example, the interactive computer-based presentation may be provided to the student via a local area network or a wide area network, such as the Internet. A computer program underlying the computer-based presentation may comprise a combination of code segments written in any suitable programming language, such as, for example, Java or C++, and stored in or on any suitable computer-readable memory medium, such as, for example, a hard drive or compact disk on a conventional server for access via the network by a conventional personal computer. This allows students, wherever they may be, to logon to the presentation and benefit therefrom.

Figure 3:
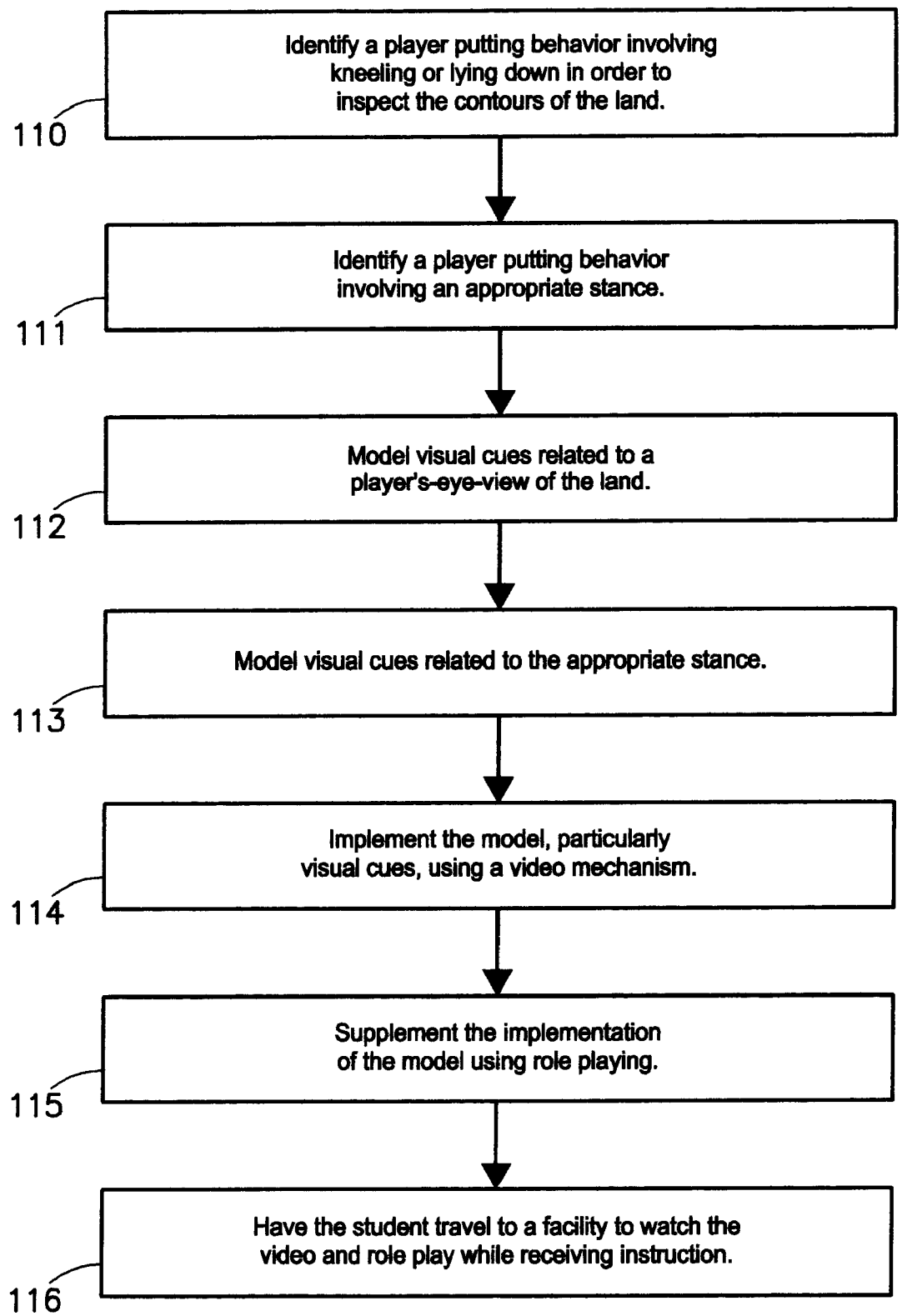
FIG. 3 is a flowchart showing a sequence of example-specific steps based upon the general steps of FIG. 1.
Figure 4:
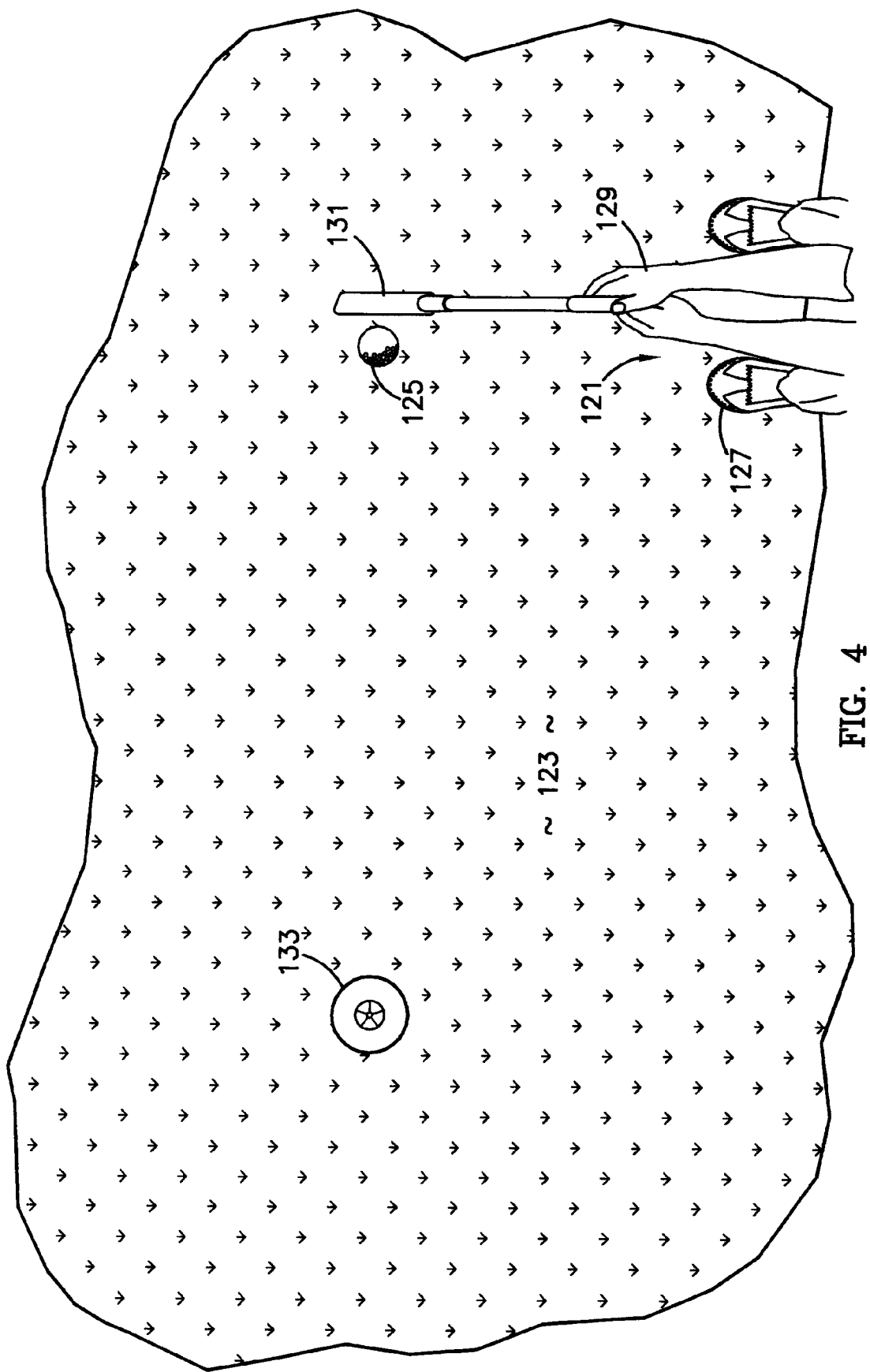
FIG. 4 is a perspective view looking down on an area of land associated with putting a golf ball, wherein the perspective is that of a golfer.

Referring also to FIGS. 3 and 4, in another example, given the general steps heretofore described, the method may be used to teach a skill involving an aspect of playing a game, such as, for example, golf, tennis, or poker, whereby the student experiences the perspective of a player 121 concerning the aspect of playing the game. Implementation of the method begins by identifying a behavior of the player 121 related to the aspect of playing the game. For example, where the game is golf and the aspect is putting, the behavior may include kneeling or lying down in order to better inspect the contours of the land 123 over which a golf ball 125 must travel, as depicted in box 110. The behavior may then progress to adopting an appropriate stance given the contours of the land 123 and other considerations, as depicted in box 111.

Once the behavior is identified, the player's perspective must be modeled in terms understandable by the student. Thus, a player's-eye-view of the contours of the land 123 may first be shown, and then, once the player has adopted the proper stance, a player's-eye-view of the golf ball 125, the player's shoes 127, the player's grip 129; a golf club 131, and a cup 133 may be shown, as depicted in boxes 112 and 113.

Next, an appropriate mechanism must be selected and used to implement the model, wherein the mechanism is suitable for imparting to the student the perspective of the player 121. A video mechanism, for example, may be used to show the views discussed above, as depicted in box 114. Optionally, while watching the video the student may be required to role-play wherein the student adopts the behaviors to result in the student having the same perspectives shown on the video. Thus, in this latter embodiment, student will adjust his or her stance until he or she sees the same view as the player 121, as shown on the video, as depicted in box 115.

Lastly, the student must be introduced to the mechanism so that, through the mechanism, the student is able to experience the perspective of the player and to thereby better understand the behavior. Where the mechanism is a simple video, the student may watch it and learn in the privacy of their own home and at their own convenience. Alternatively, the student may travel to a facility wherein an instructor is able to assist the student while watching the video, as depicted in box 116.

For the preceding description, it will be appreciated that the present invention provides a method of teaching a skill whereby a student is exposed to or otherwise experiences a perspective of a relevant thing, whether person, animal, or object, as determined by the nature of the skill, and wherein a mechanism is used to impart the perspective, thereby advantageously providing a better understanding of the behavior and an improvement in performance of the skill.

Although the invention has been described with reference to the preferred embodiments illustrated in the attached drawings, it is noted that equivalents may be employed and substitutions made herein without departing from the scope of the invention as recited in the claims. For example, as mentioned, suitable and appropriate mechanisms, such as prerecorded video, computer animation, virtual reality, and role-playing, may be employed for conveying to the student the perspective of the thing, and the present invention is generally independent of any particular mechanism.

Having thus described the preferred embodiment of the invention, what is claimed as new and desired to be protected by Letters Patent includes the following:

1. A method of teaching a skill to a student, wherein the skill involves an aspect of hunting an animal, whereby the student is exposed to a perspective of the animal, the method comprising the steps of:

(a) identifying a behavior of the animal, wherein the behavior is related to the aspect of hunting;

(b) modeling a perspective of the animal related to the behavior in terms understandable by the student;

(c) implementing the model using a mechanism suitable for imparting to the student the perspective of the animal; and (d) introducing the student to the mechanism such that, through the mechanism, the student is able to experience the perspective of the animal and to thereby better understand the behavior and the skill.

2. The method as set forth in claim 1, wherein the animal is a duck, and the aspect of hunting involves preparing a blind and lying-in-wait for the duck, arranging duck decoys, and responding to duck calls, and the perspective involves visual and audible sensory cues to the duck.

3. The method as set forth in claim 1 wherein a video recording is the mechanism for implementing the model and imparting to the student the perspective of the animal.

4. The method as set forth in claim 1, wherein a computer program involving computer animation is the mechanism for implementing the model and imparting to the student the perspective of the animal.

5. The method as set forth in claim 1, wherein the behavior is in response to an improper action related to the aspect of hunting so that the student is taught a consequence of the improper action.

6. The method as set forth in claim 1, wherein the behavior is in response to a proper action related to the aspect of hunting so that the student is taught a benefit of the proper action.

7. A method of teaching a skill to a student, wherein the skill involves an aspect of hunting a duck, whereby the student is exposed to a perspective of the duck, the method comprising the steps of:

(a) identifying a behavior of the duck, wherein the behavior is related to the aspect of hunting the duck, and the aspect of hunting the duck includes preparing a blind and lying-in-wait for the duck, arranging a plurality of duck decoys, and responding to a duck call;

(b) modeling a perspective of the duck related to the behavior in terms understandable by the student;

(c) implementing the model using a mechanism suitable for imparting to the student the perspective of the duck; and (d) introducing the student to the mechanism such that, through the mechanism, the student is able to experience the perspective of the duck and to thereby better understand the behavior and the skill.

\* \* \* \* \*